United States Patent [19]

O'Hara

[11] Patent Number: 5,058,424
[45] Date of Patent: Oct. 22, 1991

[54] WHEEL END PLAY SETTING DEVICE

[75] Inventor: Douglas J. O'Hara, Chatham, Canada

[73] Assignee: Navistar International Transportation Corp., Chicago, Ill.

[21] Appl. No.: 603,578

[22] Filed: Oct. 25, 1990

[51] Int. Cl.[5] ............................................. G01M 15/00
[52] U.S. Cl. ...................................... 73/118.1; 29/252
[58] Field of Search ......................... 384/248, 249, 251; 73/118.1; 33/517; 29/252, 255, 270, 271, 274, 407

[56] References Cited

U.S. PATENT DOCUMENTS

| 2,932,900 | 4/1960 | Hanlon | 33/517 |
| 4,054,999 | 10/1977 | Harbottle | 29/407 |
| 4,530,144 | 7/1985 | Hagelthorn | 29/407 |

FOREIGN PATENT DOCUMENTS

| 0229301 | 9/1988 | Japan | 33/517 |
| 0842450 | 6/1981 | U.S.S.R. | 33/517 |

OTHER PUBLICATIONS

Primary Examiner—Robert Raevis
Attorney, Agent, or Firm—Dennis K. Sullivan

[57] ABSTRACT

A wheel end play measuring device including a pneumatic actuator attached to the wheel with its rod in axial alignment with the wheel axle and an indicator associated with the actuator rod to indicate the axial end play of the wheel bearing. Adjustment of the wheel relative to the axle for setting the wheel bearings at the desired tightness is accomplished by tightening the adjustment nut to a solid condition, actuating the pneumatic cylinder to pull the wheel to the outboard limit of the end play, setting the indicator to zero, and backing off the adjustment nut until the desired end play setting is shown on the indicator.

11 Claims, 3 Drawing Sheets

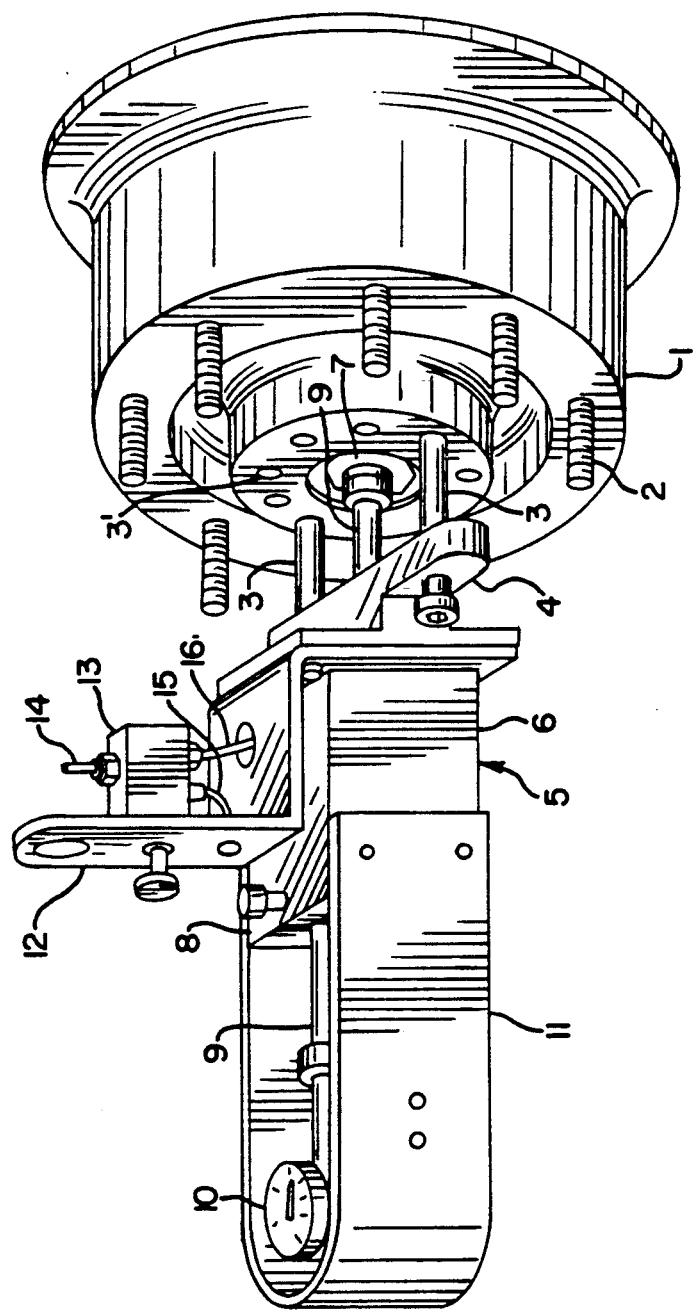

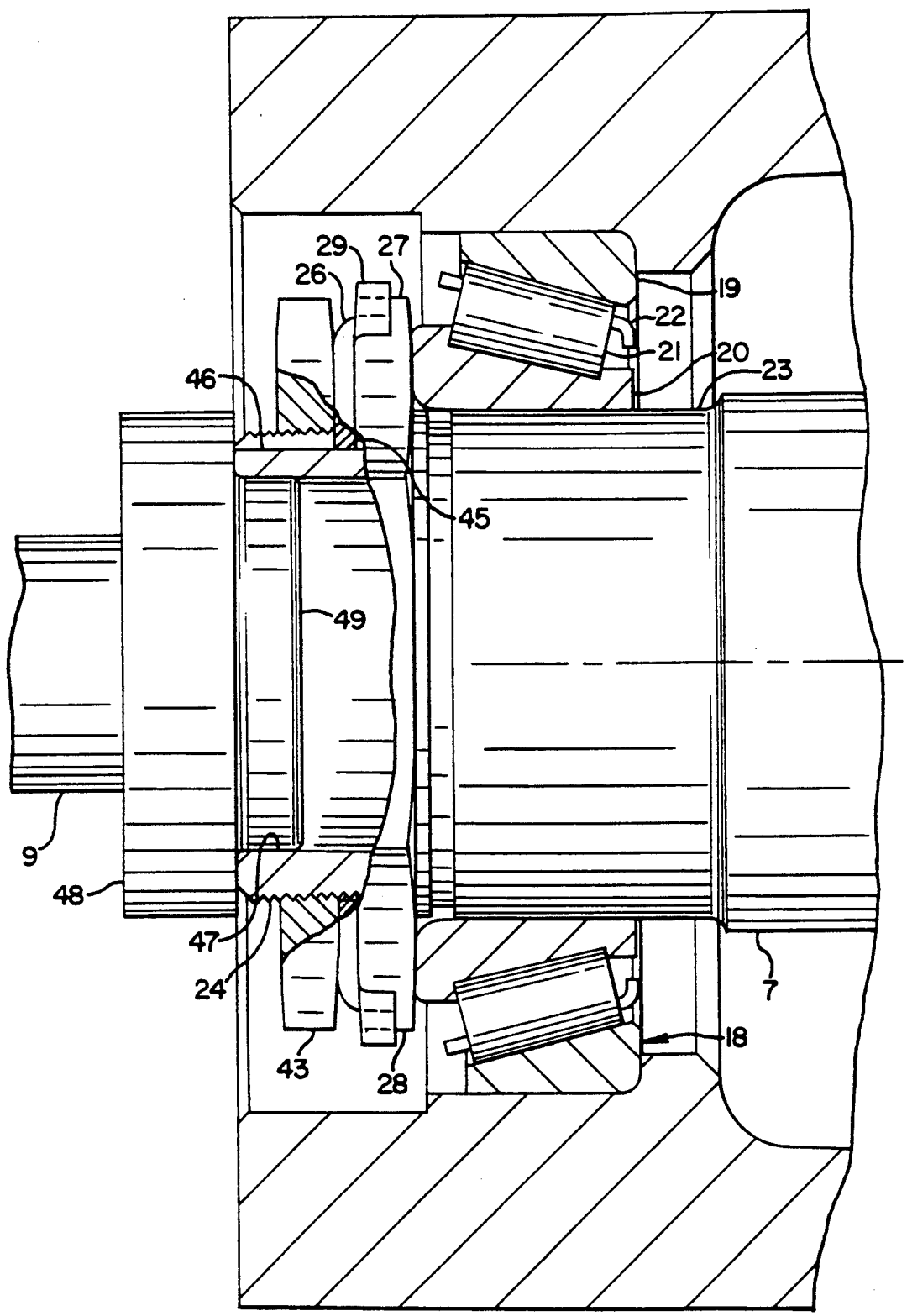

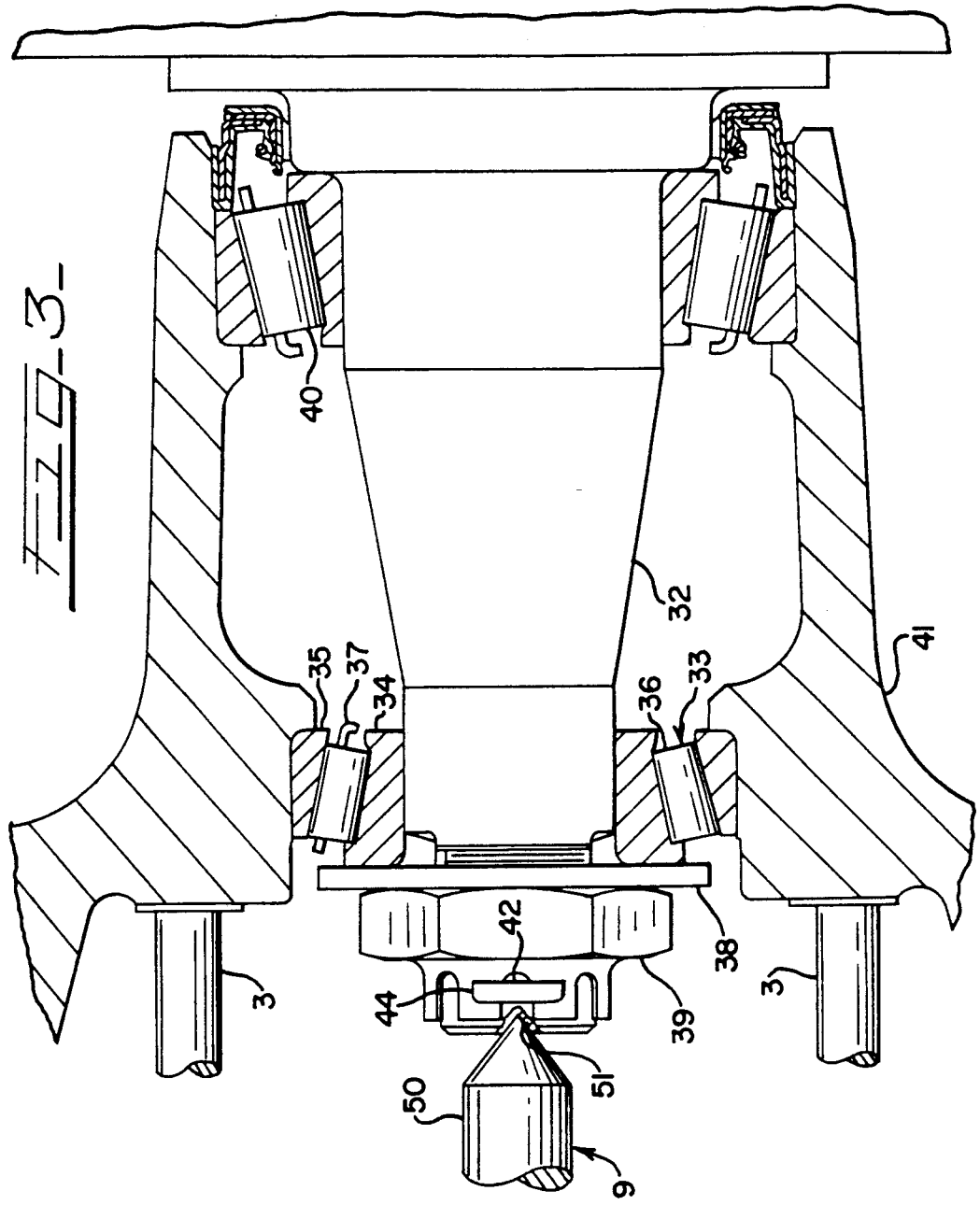

WHEEL END PLAY SETTING DEVICE

BACKGROUND OF THE INVENTION

This invention relates to adjusting wheel bearings in automotive vehicles, such as medium and heavy duty trucks, and more particularly, to a wheel bearing end play setting device which takes-up the bearing end play and provides accurate and consistent readings of the bearing end play and also to a method of setting the wheel bearing end play.

Automotive wheel bearings usually are tapered roller bearings disposed on each axial end of the wheel and positioned so that pressing the inner bearing race tightens the tapered roller bearings. Normally, adjustment of the bearing end play is done by tightening the bearing with an adjustable castellated nut threaded on the axle spindle to a snug position and then backing off the castellated nut a predetermined fraction of a turn and setting a cotter key to lock the nut on the spindle. Although this method of wheel bearing adjusting has been generally satisfactory, it has been found to be inconsistent in the amount of end play produced and provides no indication of the actual bearing end play. If a bearing were too tight or too loose, it may fail requiring at least the replacement of the bearing.

SUMMARY OF THE INVENTION

It is an object of this invention to provide a method of adjusting end play on wheel bearings.

It is another object of this invention to provide an apparatus of accurately adjusting the wheel bearing end play on a vehicle.

It is a further object of this invention to provide a bearing end play mixture to accurately measure end play of the wheel bearings on a vehicle.

It is a further object of this invention to provide a method of accurately measuring wheel bearing end play of tapered roller wheel bearings on a vehicle wheel.

The objects of this invention are accomplished in an apparatus for measuring wheel bearing end play including a base member mounted a vehicle wheel and a pneumatic actuator mounted on the base member and having a measuring element aligned with and engaging the end of the axle shaft and an indicator for indicating the relative movement of the measuring element. After the bearing is tightened to a solid or no-end-play position, the pneumatic actuator is actuated to automatically pull the wheel outwardly on the shaft and maintain the bearing in contact with the adjusting nut thereby taking up all of the end play provided in the bearings. The indicator on the apparatus is then set to zero. The bearing adjustment nut is then backed off to slightly loosen the bearing and, because the wheel is forced outwardly relative to the axle, the bearing indicator will indicate the total end play of the wheel relative to the shaft or the looseness of the bearings on the vehicle wheel. When the desired setting is shown on the indicator, the bearing adjustment nut is then locked in position. The fixture is then removed from the wheel and the wheel is in operating condition.

The invention thus provides a means of accurately measuring the end play to an accuracy of a thousandth of an inch to improve the reliability and operation of the bearing by ensuring the proper bearing tightness.

DESCRIPTION OF THE DRAWINGS

Other objects and advantages of the invention will become more apparent upon reading the detailed description thereof and upon reference to the drawings, in which:

FIG. 1 is a perspective view of a vehicle rear wheel with the wheel end play setting device mounted thereon;

FIG. 2 is a cross-section of a portion of the vehicle wheel of FIG. 1 with a portion of the end play measuring element shown engaging the end of the axle; and FIG. 3 is a cross-section similar to FIG. 2 of an alternative embodiment of the invention used for a front vehicle wheel and axle.

DESCRIPTION OF THE PREFERRED EMBODIMENT

FIG. 1 illustrates a rear wheel hub 1 of a vehicle, such as a medium or heavy duty truck, with the wheel mounting stud bolts 2 extending from the hub and an inner circle of bolt holes 3' to which an axle drive shaft flange (not shown) would be attached upon subesquent assembly of the vehicle. For purposes of adjusting the wheel end play in accordance with the invention, two shoulder bolts 3 are mounted in diametrally opposite holes 3' on the hub 1 and rigidly support in fixed postion a base plate 4 which in turn supports the end play measuring device 5 in fixed position.

The device 5 includes a pneumatic actuator housing 8 forming the cylindrical housing portion of a conventional linear pnuematic actuator 6 having an internal piston (not shown) within the housing 8 and a rod 9 attached to the piston and extending through both ends of the actuator 6 between the end of the axle 7 and an indicator 10, such as a dial indicator or electronic equivalent thereof mounted within a protective U-shaped housing 11 extending around the indicator and rod. An L-shaped bracket 12 mounted to the base member 4 supports an air valve 13.

The air valve 13 has a control button 14 which turns the air valve on and off to actuate the actuator 6, the valve being supplied through a conduit 15 from a source of pressurized air. When the valve is in the "ON" position, air pressure is allowed to flow through a conduit 16 which biases the piston to seat the control rod 9 on the end of the axle. Since the device is mounted to the wheel and the rod engages the axle end, the air pressure will automatically try to pull the wheel off the axle and thus always locates the wheel to the outermost limits, defined by adjusting nut 28, permitted by the end play in the wheel bearings. Because air is compressible and the pressure is preferably not too high, relative movement between the wheel and the axle can be manually induced even though there is air pressure in the cylinder, permitting checking the accuracy of the indicator reading.

Referring to FIG. 2, the rear wheel hub 1 and axle 7 are shown in cross section with the end of the rod 9 of the device engaging the rear axle 7. The wheel hub 1 is mounted on an outboard bearing 18 which includes an outer race 19 and inner race 20 and rollers 21 disposed with their axes tapering toward the inboard side of the wheel, a cage 22 holding the bearings in position. The axle has a cylindrical surface 23 for supporting the inner race 20 of the bearing 18. As is conventional, a similar bearing arrangement similar to FIG. 3 is provided between the wheel hub 1 and the axle 7 on the inboard side of the wheel hub 1 and is positioned thereon with the taper of the bearings to the outboard side of the bearing so that both bearings are simultaneously tightened when the inner race 20 of the outer bearing is tightened.

The outer end of the axle 7 is threaded as at 24 to threadedly engage an adjusting nut 28 which seats against and locates the inner bearing race 20. The threaded portion 24 extends outwardly to carry a lock nut 43. Between the adjusting nut 28 and lock nut 43, a lock washer 26 is nonrotatably mounted on the axle 7 by means of a spline connection. Integral lugs 45 are angularly spaced internally of the washer 26 and mating grooves 46 are formed on the axle. This nonrotatable feature allows the integral peripheral tabs 29 on the lock washer 26 to engage the corners 27 of the hexagonal adjusting nut 28 and lock the adjusting nut in position. Once the adjusting nut is in the operating position, the lock nut 43 is tightened against the washer 26 to further lock the bearings in their operating position. Since the rear axle 7 has a central bore 47 through which the axle drive shaft (not shown) extends during operation of the vehicle, the axle engaging element 48 of the actuator rod 9 is of approximately the same diameter as the axle and has an axially projecting reduced diameter cylindrical portion 49 at its distal end which is received within central bore 47 to provide a shoulder for engaging the axle while locating the fixture concentrically thereto.

As shown in FIG. 3, the axle engaging portion 50 of the device 5 is conical to engage a conical depression 51 in the end of a front wheel spindle 32. Otherwise, the device 5 is identical to the rear wheel embodiment of FIGS. 1 and 2. The threaded spindle 32 supports the outboard bearing 33, including the inner race 34, outer race 35 and rollers 36 carried in the cage 37, and an inboard bearing 40. The front wheel hub 41 is thus supported on the spindle similar to the manner in which the rear wheel hub is supported on the axle as discussed above. A washer 38 is mounted for the engagement with the inner race 34 and a castellated adjusting nut 39, or a standard nut with a castellated collar, threaded on the spindle 32 is tightened against the washer 38 to snugly tighten both bearings to a no-end-play condition to zero the indicator 10. As before, the rod 9, 50 measures the position of the spindle 32 relative to the wheel hub 41 while the pneumatic cylinder pulls the wheel hub to the limit provided by the bearing end play. Then the castellated nut is backed out to the desired wheel end play clearance desired for optimum operating condition of the wheel. Then a cotter key 44 is positioned in an opening 42 to lock the castellated nut on the spindle to fix the end play of the bearings. The wheel bearings are then in operating position.

From the foregoing discussion, the method of adjusting end play using the device 5 should be apparent to those of skill in the art. The adjusting nut 28, 34 is tightened to remove all endplay from the wheel bearings. The device 5 is firmly attached to the wheel hub 1 or 41 with the pneumatic actuator rod 9 axially aligned with the axle or spindle axis. The pneumatic cylinder is actuated by valve 13 to engage the end of the rod 9 with the axle or spindle to automatically take up any end play permitted by the bearing adjustment by pulling the wheel toward the end of the axle. Since the bearings have been tightened to remove the end play, the indicator 10 is set to zero. The adjusting nut 28, 34 is then backed out, the air cylinder forcing the wheel hub to automatically remain in engagement with the adjusting nut, until a predetermined amount of bearing end play is shown on the indicator. The position of the adjusting nut may then be fixed as by the lock nut or cotter key with the indicator showing the final end play of the bearings. The device 5 may then be removed from the wheel hub and the drive axle shaft (not shown) installed in the rear axle with its flange bolted to the bolt circle 3'.

In actual practice, however, it has been found to be more convenient, because the rod 9 prevents nuts from being placed over the spindle, to remove the device from the wheel hub 1 before installing the lock nut 43 on the rear axle. However, this has the effect of altering the final bearing clearance from the measured clearance because the lock nut 43 forces the adjusting nut 28 against the inboard side of the thread whereas the pneumatic cylinder forces the nut against the outboard side. Since thread dimensions are very consistent, this can be reliably compensated for by allowing an additional amount on the indicator beyond the desired clearance. For example, an indicated clearance of 0.010" to 0.012" on the indicator 10 may be used to obtain a final end play of 0.005" to 0.007".

On the front spindle, wherein the castellated nut is locked by a cotter key and not by a jam nut, the thread slop problem does not exist. Consequently, no compensation is necessary other than for aligning a nut aperture with the cotter key hole in the spindle.

It is also to be noted that because the rod 9 remains engaged at all times during the adjusting process with the end of the axle or spindle, and because the wheel studs 3 are already present in the wheel hub 1, 41, it is desirable to use an offset open end wrench on the front axle and a split socket attached to a radial lever arm on the rear axle to adjust the adjusting nut while accommodating the presence of the rod 9. Such tools may be easily fabricated from existing sockets and bar stock in a machine shop.

Thus, there has been provided, in accordance with the invention a wheel end play adjusting device and method which fully satisfies the objects, aims and advantages set forth above. It is recognized that others may develop variations, alternatives and modifications of the invention after a perusal of the foregoing specification. Accordingly, it is intended to cover all such variations, modifications, and alternatives as may fall within the scope of the appended claims.

What is claimed is:

1. A method of adjustably setting wheel bearing end play on a wheel mounted by bearings on an axle comprising the following steps:
   mounting an automatic bearing end play take-up device on a wheel, said device having a movable portion in axially aligned contact with end of the wheel axle, said take-up device having indicator means for measuring the relative movement between said device and said axle end;
   tightening a wheel bearing adjusting nut until the wheel bearings are tight;
   actuating said device to take up bearing end play;
   reading said indicator means to determine an initial reading;
   backing off the wheel bearing adjusting nut to an indicator means reading corresponding to the desired amount of end play for proper bearing operation;
   locking the adjusting nut in position; and
   removing the device.

2. The method of adjustably setting the wheel end play as set forth in claim 1 and said device automatically and continuously pulling said wheel outwardly on said axle and taking up said bearing end play to the outboard side of said axle.

3. The method of adjustably setting wheel bearing end play as set forth in claim 1 and said device maintaining said bearing in a fixed postion relative to said adjusting nut.

4. The method of adjustably setting wheel bearing end play as set forth in claim 1 and said device comprising a pneumatic actuator, the method further comprising continuously and automatically maintaining said wheel at the outboardmost position permitted by the wheel bearings.

5. An end play take-up and measuring device for a vehicle wheel mounted by a pair of bearings on an outboard end of a vehicle axle comprising:
 a base plate;
 means for mounting said base plate in fixed position on said vehicle wheel;
 a linear actuator having a housing mounted on said base plate, said linear actuator having a movable rod disposed to axially engage said end of said vehicle axle;
 means for selectively actuating said linear actuator to pull said vehicle wheel in an outboard direction relative to said vehicle axle; and
 an indicator means operatively associated with said device for indicating relative movement of said axle relative to said wheel.

6. An end play setting device as set forth in claim 5 wherein said linear actuator is a pneumatic actuator and said selective actuating means is an air valve for activating and deactivating said pneumatic actuator.

7. An end play setting device as set forth in claim 6 wherein said indicator means measures the movement of said actuator rod.

8. In combination with a vehicle wheel mounted by a pair of bearings on a vehicle axle, said axle including a wheel end play adjusting means, a wheel end play take-up and setting device comprising:
 a base plate mounted on said wheel;
 a pneumatic actuator mounted on said base plate and having a movable rod disposed in an engaging position with said axle, said actuator being disposed upon actuation to continuously and automatically maintain the position of said wheel at the outboardmost position on said axle permitted by said end play adjusting means; and
 an indicator means for measuring relative position of said wheel on said axle, whereupon the measurement of said wheel in a no-end-play position and in an adjusted-end-play position can be read on said indicator and differenced to indicate the actual end play provided in said adjusted-end-play position.

9. The wheel end play take-up and setting device in accordance with claim 8 wherein said wheel end play adjusting means comprises a nut disposed on said axle and defining an outboard limit for said bearing end play and locking means on said axle for locking the nut in an adjusted position.

10. The wheel end play take-up and setting device in accordance with claim 8 wherein said end play adjusting means includes a castellated nut threadedly engaging said axle and pressing a washer against an inner race of said bearing.

11. The wheel end play take-up and setting device in accordance with claim 8 wherein said end play adjusting means includes an adjusting nut for tightening against an inner race of the bearing, a nonrotatable lock washer connected to said axle outboard of said nut having tab means to lock said nut in a fixed position on said axle, and a lock nut for locking said washer against said adjusting nut in the operating position.

* * * * *